United States Patent
McClennon et al.

(10) Patent No.: US 6,408,327 B1
(45) Date of Patent: Jun. 18, 2002

(54) SYNTHETIC STEREO CONFERENCING OVER LAN/WAN

(75) Inventors: R. Scott McClennon, Ottawa; Andre J. Robert, Woodland, both of (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/218,135

(22) Filed: Dec. 22, 1998

(51) Int. Cl.$^7$ ................................................. G06F 15/16
(52) U.S. Cl. ........................................ 709/204; 709/231
(58) Field of Search ................................ 709/204, 205, 709/231; 370/389, 260; 379/93.01, 202, 206, 388; 381/17, 92; 463/42

(56) References Cited

U.S. PATENT DOCUMENTS

| | | | |
|---|---|---|---|
| 5,335,011 A | * 8/1994 | Addeo et al. | 379/206 X |
| 5,579,389 A | * 11/1996 | Wagner et al. | 379/388 |
| 5,778,082 A | * 7/1998 | Chu et al. | 381/92 |
| 5,889,843 A | * 3/1999 | Singer et al. | 379/202 |
| 5,940,479 A | * 8/1999 | Guy et al. | 379/93.01 |
| 5,963,547 A | * 10/1999 | O'Neil et al. | 370/260 |
| 5,991,385 A | * 11/1999 | Dunn et al. | 379/202 |
| 6,078,669 A | * 6/2000 | Maher | 381/17 |
| 6,125,115 A | * 9/2000 | Smits | 370/389 |
| 6,241,612 B1 | * 6/2001 | Heredia | 463/42 |
| 2002/0013813 A1 | * 1/2002 | Matsuoka | 709/204 |

OTHER PUBLICATIONS

Douglas E. Sturim et al., Tracking Multiple Talkers Using Microphone–Array Measurements, 1997, IEEE pp. 371–374.*

Pi Sheng Chang et al., Performance of 3D Speaker Localization Using a Small Array of Microphones, 1998, IEEE, pp. 328–332.*

* cited by examiner

*Primary Examiner*—Patrice Winder
(74) *Attorney, Agent, or Firm*—Foley & Lardner (57) ABSTRACT

A method of and system for facilitating synthetic stereo audio conferencing of a plurality of users over a local or wide area network (LAN/WAN). The disclosure describes a system architecture using a LAN/WAN to support synthetic audio conferencing thus allowing, at a receiving user location, for the spatially distinct virtual "placement" of the other parties involved in a conference call. This enables the user to differentiate between the various other parties and to discern which one or more of the parties are talking at any given time. In a first embodiment of the invention, both stereo synthesis and conferencing are client-based functions. In a second embodiment of the invention, both stereo synthesis and conferencing are server-based functions. In a third embodiment of the invention, stereo synthesis is a server-based function and conferencing is a hybrid client/server function using multicast.

23 Claims, 6 Drawing Sheets

SYNTHETIC STEREO CONFERENCING OVER LAN/WAN

FIELD OF THE INVENTION

The invention relates to the conferencing of users of a local or wide area network (LAN/WAN). Specifically, the method and system of the present invention provide for synthetic stereo audio conferencing of a plurality of users over a LAN/WAN.

BACKGROUND OF THE INVENTION

Allowing multiple telephone users to be connected to and communicate with one another on the same call, a feature known as "conferencing," is a commonly found and popular application of traditional circuit-switched telephone networks. Since conference calls involve a number of parties, from the perspective of an individual user involved in such a call, it is often desirable to be able to discern which one or more of the parties are talking at any given time. For a variety of reasons, it can sometimes be difficult to distinguish between talkers in a conference call. For example, they may have similarly sounding voices, they may be talking at the same time or they may be speaking too softly to distinguish; between them.

One way to provide the users involved in a conference call with some idea as to which of the other parties in the call is talking is to provide for stereo signal transmission and to equip the users with stereo speakers. For example, in the case where one of the parties of a conference call is actually a small room full of people, multiple microphones may be used. The distribution of a talker's signal between the microphones tends to differentiate the various talkers within the room. If a left and a right microphone are used and the signals generated therefrom can be transmitted to the others users, those other users with stereo speakers (left and right) will be able to distinguish between talkers in the room based upon the left to right distribution of the talkers' voices. In other words, the voice of a talker in the left side of the room will, to the receiving users in the conference call, sound "louder" in the left speaker of the user equipment than in the right. Thus, that particular talker will sound, to the other users, as though the talker were located on the left in relation to other talkers in the room. The remaining users involved in the conference call will be able to distinguish between talkers in the room based upon their "location" relative to each other. Such a method, however, has limited application in that it requires that spatially distributed microphones receive the talkers' signals. Furthermore, the method does nothing to help the user differentiate between the parties in other locations who may also be involved in the conference call.

SUMMARY OF THE INVENTION

Having identified the above-described problems, the inventors have developed the following solution, which is embodied in the present invention. As described herein, the present invention provides a method of and system for facilitating synthetic stereo audio conferencing of a plurality of users over a local or wide area network (LAN/WAN). The disclosure describes a system architecture using a LAN/WAN to support synthetic audio conferencing thus allowing, at a receiving user location, for the spatially distinct "placement" of the other parties involved in a conference call. This enables the user to differentiate between the various other parties and to discern which one or more of the parties are talking at any given time. Under the present invention, individual parties need not be in the same room or have stereo microphones.

In one embodiment of the present invention for providing synthetic stereo audio conferencing of a plurality of clients over a local or wide area network (LAN/WAN), one of the clients receives the transmitted signals from each of the other clients over the LAN/WAN. Stereo versions of each of the received signals are synthesized then mixed at the one client to create a composite signal distributed over stereo channels to effect virtual positioning of each of the other clients. The composite signal is then output to the user of the one client as stereo audio over, for example, a left speaker and a right speaker, such that the other conferenced parties sound as though they are spatially distributed about the user.

In another embodiment of the present invention for providing synthetic stereo audio conferencing of a plurality of clients over a local or wide area network (LAN/WAN), a server within the LAN/WAN receives the transmitted signals from the plurality of clients. Stereo versions of each of the received signals are synthesized and then mixed at the server to create at least one client-specific composite signal distributed over multiple channels to effect virtual positioning of the plurality of clients. This composite signal is then transmitted to one of the clients. The client-specific composite signal transmitted to that one client does not include that client's own transmitted signal (which would otherwise be received as echo). The composite signal is then output to the user of the one client as stereo audio over, for example, a left speaker and a right speaker, such that the other conferenced parties sound as though they are spatially distributed about the user.

In yet another embodiment of the present invention for providing synthetic stereo audio conferencing of a plurality of clients over a local or wide area network (LAN/WAN), a server within the LAN/WAN receives the output signals from the plurality of clients. Stereo versions of the received signals are synthesized and then mixed at the server to create a single multicast signal distributed over multiple channels to effect virtual positioning of the clients. The multicast signal is transmitted to each of the clients. A client receiving the multicast signal comprises an echo controller for removing, from the received multicast signal, a synthetic stereo component corresponding to the signal transmitted from that client. The remaining, composite signal is output to the user of the client as stereo audio over, for example, a left speaker and a right speaker, such that the other conferenced parties sound as though they are spatially distributed about the user.

Other features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The present invention will be described below with reference to the accompanying drawings, wherein.

DETAILED DESCRIPTION OF THE PREFERRED EMBODIMENTS

As described herein with reference to the accompanying drawings, the method and system of the present invention provide for synthetic stereo audio conferencing of a plurality of users over a LAN/WAN. The disclosure describes a system architecture using a LAN/WAN to support synthetic audio conferencing thus allowing, at a receiving user location, for the spatially distinct virtual "placement" of the other parties involved in a conference call. This enables the user to differentiate between the various other parties and to discern which one or more of the parties are talking at any given time.

Figure 1:
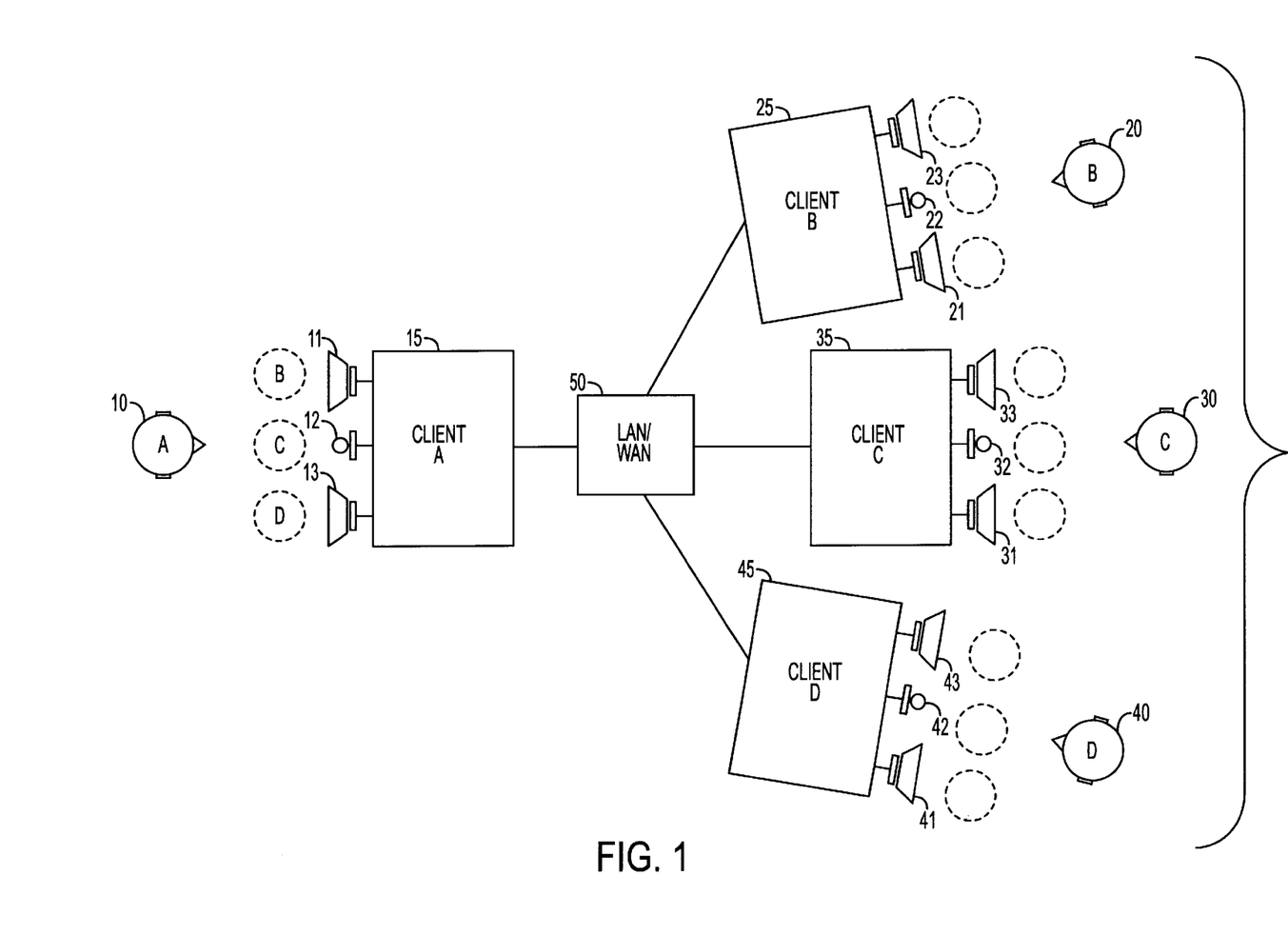
FIG. 1 is a diagram illustrating the use of synthetic stereo placement of parties in a conference call according to the present invention.

FIG. 1 is a diagram illustrating the use of synthetic stereo placement of parties in a conference call in accordance with the present invention. The figure shows a conference connection between four parties, where client A 15, client B 25, client C 35 and client D 45 are all connected through a local or wide area network (LAN/WAN) 50. The actual users at the corresponding clients are shown as user A 10, user B 20, user C 30 and user D 40. Each of the clients receives, over the LAN/WAN 50, the output signals from the other clients involved in the conference call. The received signal may be a composite of all or some of the signals or may be separate and distinct signals from each of the other clients. The functions of the server (not shown) and the clients on the creation and communication of the signals to the clients will be discussed in detail herein in the description of the different embodiments of the present invention.

There are numerous techniques for stereo synthesis, or even three-dimensional audio synthesis know to those skilled in the art. These methods vary in effectiveness, depending upon the listening environment, and in complexity. The present invention is not limited by the exact method used.

As shown, each of the clients in FIG. 1 comprises a hands-free telephone, such a speakerphone. One microphone is shown for each client as 12, 22, 32, 42, to accept as input the corresponding user's voice. Also shown are two speakers (left/right) for each client 11/13, 21/23, 31/33, 41/43. These speakers output to the corresponding user the voices of the other users in the conference call. These voices, however, are output over the two speakers such that the different parties are spatially distributed and are virtually positioned from left to right in front of the individual users. The virtual positioning of users in the conference call of FIG. 1 is represented by the dotted line figures facing the individual users 10, 20, 30 and 40.

As shown in FIG. 1 with respect to user A 10 who is facing the equipment of the corresponding client A 15, the voice of user B in the conference call would sound as though it were originating from the left, the voice of user C would sound as though it were originate from straight ahead and the voice from user D would sound as though it were originating from the right. Dotted line figures show the virtual locations of user B, user C and user D as created at client A 15. During stereo synthesis of the signals from the various parties, the distribution of each signal over the two channels (left and right) corresponding to the two output speakers is adjusted such that they are spatially distributed from left to right. For example, the virtual positioning of user B as being to the left of user A 10 is effected by transmitting a relatively stronger signal of user B's voice to the channel output through speaker 11 (left channel) and by sending a relatively weaker and slightly delayed signal of user B's voice to the channel output through speaker 13 (right channel). Similarly, the virtual positioning of user D as being to the right of user A 10 is effected by transmitting a relatively stronger signal of user D's voice to the channel output through speaker 13 (right channel) and by sending a relatively weaker and slightly delayed signal of user D's voice to the channel output through speaker 11 (left channel). Virtual positioning of user C as being directly ahead of user A 10 is effected by transmitting signals of equal strength of user C's voice to both channels. This virtual placement of parties in a conference call, as described above, occurs for the other parties as well, as shown by the dotted figures facing user B, user C and user D.

The virtual positioning of parties as described above allows an individual user to differentiate between the various other parties and to discern which one or more of the parties are talking at any given time. For example, when, during the course of the conference call, user B is talking, user B's voice always sounds to user A 10 as though it originates from the left. Whenever user C is talking, it always sounds to user A 10 as though the voice originates directly in front of user A. Similarly, when user D is talking, it always sounds to user A 10 as though the voice originates from the right. In this way, user A can tell which party or parties are talking at any given time based on the direction which the voice appears to originate. This can be extremely helpful, especially when certain parties of a conference call have similar sounding voices, speak softly or when multiple parties talk at the same time.

While FIG. 1 illustrates the use of stereo speakerphones at the various client sites in a conference call, the present invention is not limited thereby. It is envisioned and would be apparent to those skilled in the art that other types of devices could be used at the client sites, including, but not limited to, stereo headset telephones. In addition, not every client involved in the conference call need have stereo capability. It would be apparent to those skilled in the art that conferencing of users of many different types of equipment may be accomplished with the virtual positioning of the users occurring only at those clients with stereo audio output capability and a traditional conference signal output at the other clients. It would be apparent to those skilled in the art that the application of the method and system of the present invention is also not limited to the exact number of clients shown in FIG. 1. Furthermore, while one method of distributing client signals over multiple channels to effect virtual positioning of users has been described, the present invention is not limited thereby. Other, more complex methods of localizing a plurality of sound sources are known and are equally applicable for use under the present invention. One such method described in a pending U.S. patent application of Ding et al., Ser. No. 08/430,060, the contents of which are incorporated by reference herein.

Figure 5:
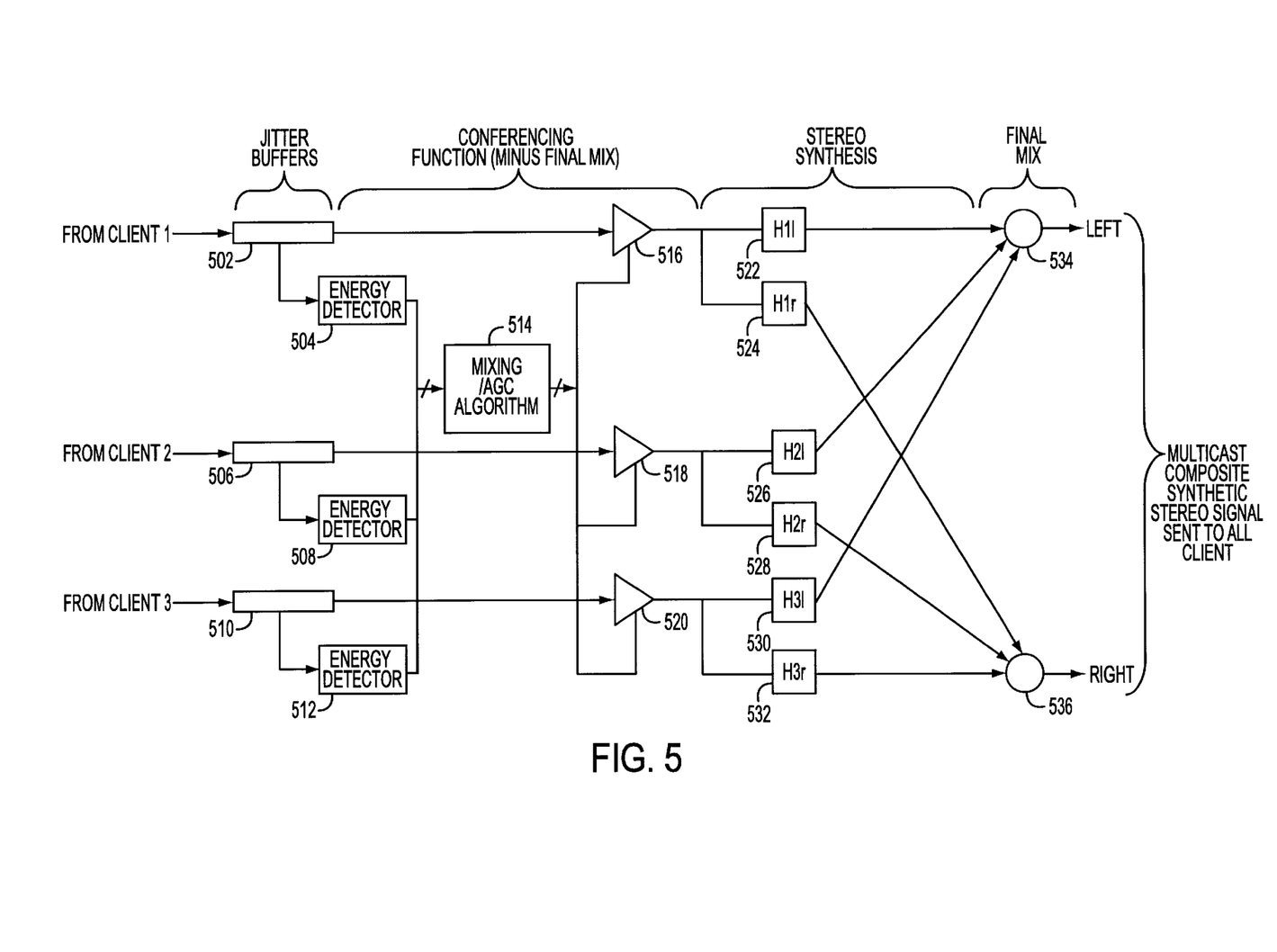
FIG. 5 is a diagram illustrating a basic signal processing flow diagram for the stereo conferencing and stereo synthesis performed in the present invention, depending on the embodiment, either at the server or at a client.

FIG. 5 shows a basic signal processing flow diagram for the stereo conferencing and stereo synthesis performed in the present invention, depending on the embodiment, either at the server or at a client. The use of signals from three clients is shown for purposes of example and not limitation. Buffers 502, 506 and 510 receive and hold samples of the signals received from client 1, client 2 and client 3. Energy detectors 504, 508 and 512 are connected to these buffers and sample the signals therein to determine the energy level present. This information regarding each of the client signals is provided to the mixing and automatic gain control algorithm 514. The algorithm controls the gain/loss applied by the variable amplifiers 516, 518 and 520 to the individual data packets of the signals from the clients. The energy detectors, thus, also provide information for identifying which one or more clients are talking at a given time and which ones are silent. Based upon the information from the energy detectors, the gain applied to the individual signals is controlled to minimize the variation of the signal levels between different talkers. Also based upon the information from the energy detectors, the gain applied to the signals from the clients who, at a given time, are not talking, can be adjusted such that the noise from those signals is suppressed. Each of the gain/loss adjusted signals is then passed through a pair of stereo-synthesis blocks (left: 522, 526 and 530, right: 524, 528 and 532) with transfer functions Hil and Hir, the left and right transfer functions, respectively, of client "i". The left and right channel outputs of these blocks are then mixed in the left and right mixers, 534 and 536, to create a stereo conference signal.

As noted above, the parties involved in a conference call, as shown in FIG. 1 are connected over a LAN/WAN 50. The benefits of using a LAN/WAN for providing the conferencing connection, particularly for synthetic stereo conferencing, is described herein. The stereo synthesis, or, in other words, the distribution of signals between the channels to effect virtual placement of parties, can be performed locally at the client or at a server within the LAN/WAN. Also described with respect to the various embodiments of the present invention are different methods and system configurations for performing the conferencing function and providing the appropriate data streams to each of the clients involved in a conference call.

The use of a LAN/WAN has been found, by the inventors, to be well suited for facilitating synthetic stereo audio conferencing, and is much more cost-effective for providing this functionality than is the traditional circuit-switched telephone network. The LAN/WAN, and Voice-Over-IP generally, enables multiple users to be inter-connected and stereo signals to be transmitted without requiring multiple circuits between the users. Only one circuit need connect an individual user. Various communication devices traditionally used in circuit-switched telephone networks can also be used to communicate over a LAN/WAN; personal computers and telephones are but two examples. Such networks can also be connected to the Public Switched Telephone Network (PSTN) via a gateway. Many offices today are already wired for connection to a local area network. Access to wide-area networks, such as the Internet, is also available to many users. Devices have been developed to facilitate voice and video communication over such networks using a standard Internet protocol (IP). Accordingly, it is possible to conference a variety of types of users. As used in the present disclosure, the term "clients" can include individual user telephones, gateways, Internet Telephones, personal computers, or other devices connected to a LAN/WAN.

Figure 2:
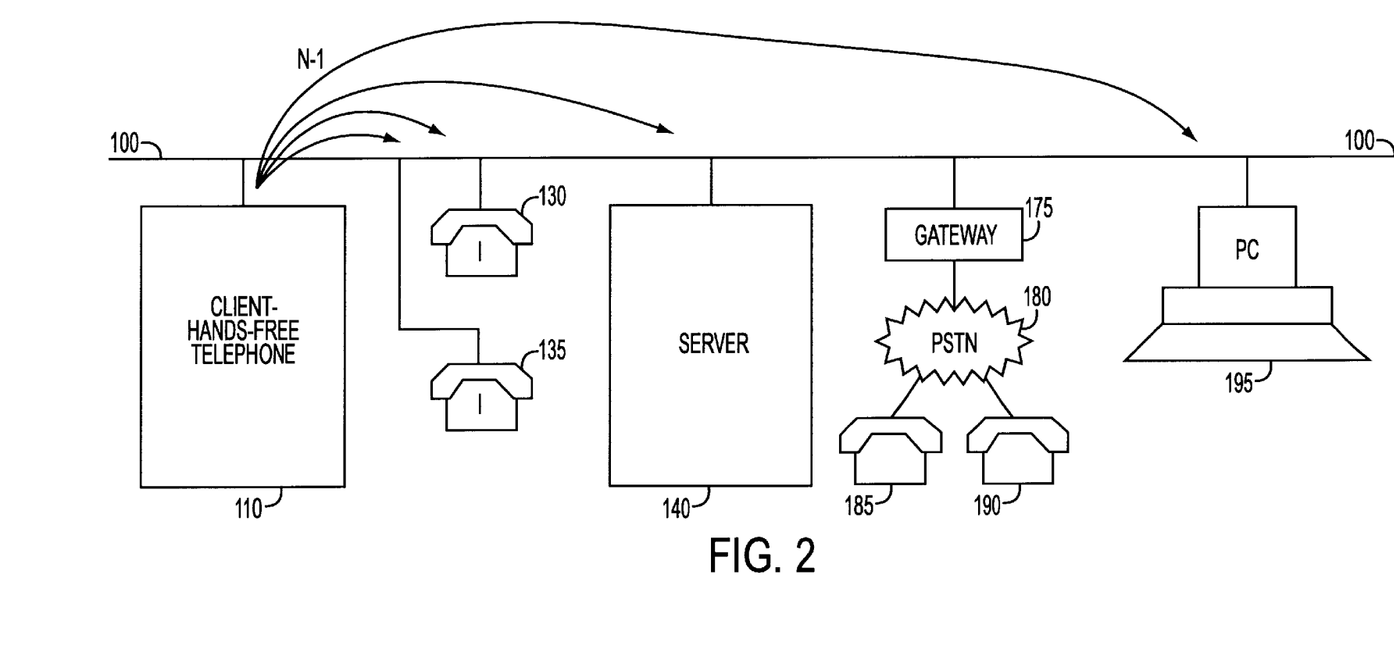
FIG. 2 is a diagram illustrating a first embodiment of the present invention where both conferencing and stereo synthesis are client-based functions.

In a first embodiment of the present invention, both the conferencing of the clients involved in a conference call and the stereo synthesis of the signals to effect virtual positioning of the users are performed locally, at the individual clients. FIG. 2 shows a client-based system for facilitating the conferencing of users over a LAN/WAN. In a client-based system, each of the clients in the conference call transmits their signals over the LAN/WAN to every other client involved in the conference call. Accordingly, each client in the conference call receives individual signals from all of the other clients involved in the call. The combination of the individually received signals is performed locally, at each of the receiving clients. The clients shown, in FIG. 2, to be participating in a conference call include: a stereo hands-free telephone 110, two Internet Telephones 130 and 135, and a personal computer 195. Also shown as a client is a gateway 175 for allowing connection from the LAN/WAN 100 to, and therefore conferencing of, telephones 185 and 190 from the PSTN 180. The conferencing of the users from the PSTN is performed, not locally, at the user equipment, but rather at the server 140 or at the gateway 175. For all other clients shown, conferencing is performed locally at each client from the signals received from every other client involved in the conference call. The result is that N−1 signals are received and N−1 signals are transmitted for each client involved in the conference call, where N represents the total number of clients involved in the conference. For example, the stereo hands-free client 110 receives four different data packet streams, one from each of the other clients involved in the conference call and combines them to allow the hands-free user to hear the conferenced connection from other users. The stereo hands-free client 110 also transmits its own signal containing the voice of the hands-free user, in four data streams shown as arrows "N−1", one to each of the other clients involved in the conference call. Similar conferencing is performed at each of the other clients. The stereo synthesis in the first embodiment of the present invention is performed at the stereo hands-free client 110. An algorithm in the client equipment mixes the individually received signals from the other clients such that the individual users are virtually positioned about the receiving client 110. This is performed in accordance with the methods of distributing individual user components over multiple channels as described above with reference to FIG. 1.

Figure 3:
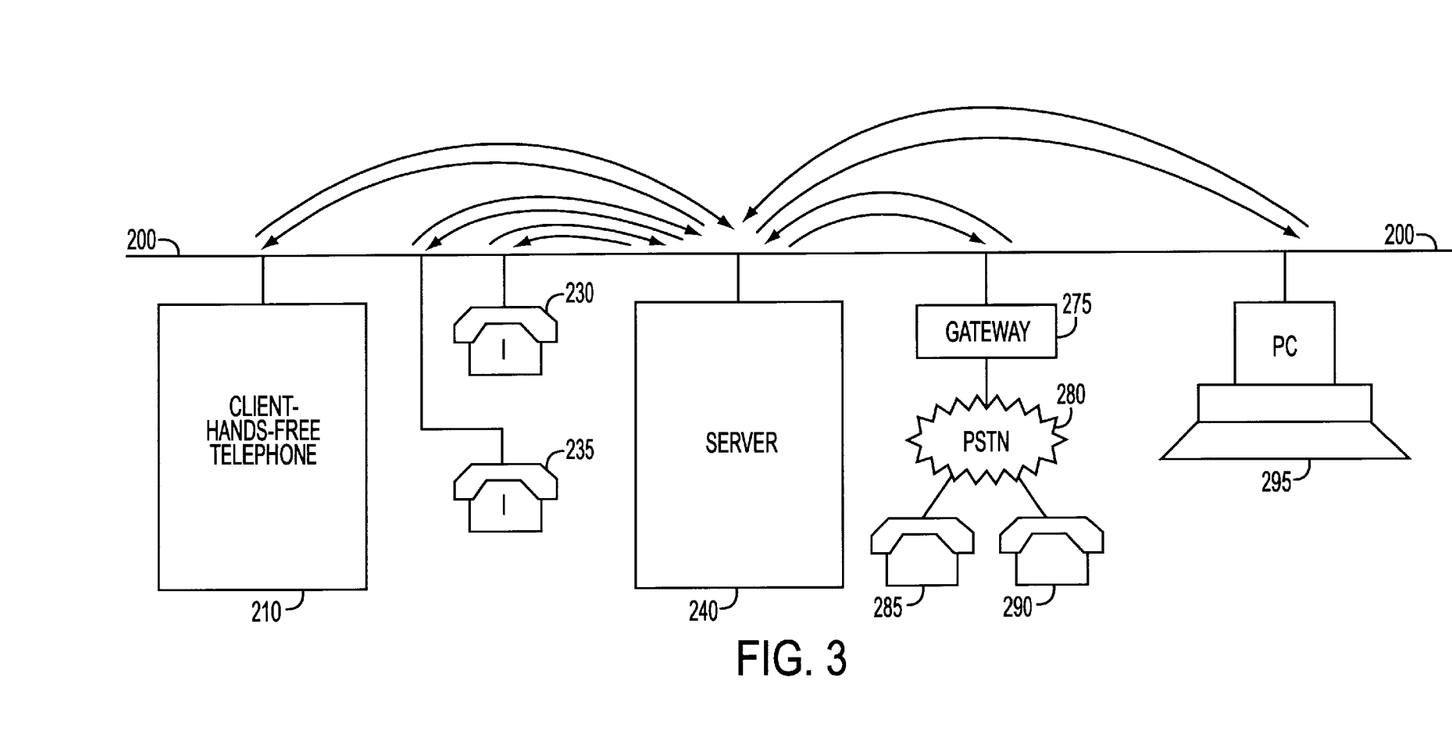
FIG. 3 is a diagram illustrating a second embodiment of the present invention where both conferencing and stereo synthesis are server-based functions.

In a second embodiment of the present invention both the conferencing of the clients involved in a conference call and the stereo synthesis of the signals to effect virtual positioning of the users are performed at a server within the LAN/WAN. The individual clients, in this embodiment, play no significant role in the conferencing or stereo synthesis and merely receive and output, through the appropriate speakers, the stereo signals as received from the server. FIG. 3 shows such a server-based system for facilitating conferencing of users over a LAN/WAN. The clients shown, in FIG. 3, to be participating in a conference call include: a stereo hands-free telephone 210, two Internet Telephones 230 and 235, and a personal computer 295. Also shown as a client is a gateway 275 for allowing connection from the LAN/WAN 200 to, and therefore conferencing of, telephones 285 and 290 from the PSTN 280. In such a server-based system, the conferencing function is performed entirely by the server 240. Each of the clients involved in a conference call transmit their individual signals to the server. The server then combines them and transmits a client specific signal to one or more of the clients. The signals sent to and from the server are shown as arrows in FIG. 3. The result is that N independent signals are received by the server and up to N independent signals are transmitted from the server to the individual clients, where N represents the total number of clients involved in the conference. The stereo synthesis in the second embodiment of the present invention is performed at the server 240. An algorithm in the server mixes the individually received signals from the clients of the involved in the conference call such that the individual users are virtually positioned about the receiving client 210. This is performed in accordance with the methods of distributing individual user components over multiple channels as described above with reference to FIG. 1.

The combined signal sent to a particular client contains the combined and synthesized signals of the other clients but does not contain that particular client's own signal. For example, the signal sent to the stereo hands-free client 210 from the server 240 would contain the combined and synthesized signals from the Internet Telephones 230 and 235, the PC 295 and the gateway 275 to the PSTN 280 connected users 285 and 290. Usually in a conference call, only one or two of the parties are speaking at any given time. The remaining parties are relatively silent. Thus, in the server-based conferencing system, at any given time only two of the signals received by the server are "active". As a result, those clients in the voice conference call who are not talking all receive separate but identical signals from the server. An accommodation can be made at the server so that all of the "non-active" clients in a conference call receive the same combined signal instead of client-specific signals.

In a third embodiment of the present invention, the conferencing of users involved in a conference call is a hybrid client/server function using multicasting while the stereo synthesis of the signals to effect virtual positioning of the users is performed at a server within the LAN/WAN. This embodiment of the present invention takes advantage of certain capabilities of existing client equipment and multicasting capabilities of the server to distribute the conference function between the server and the clients in a conference call over a LAN/WAN. Thus, unlike the purely server-based and purely client-based embodiments, in this embodiment, both the clients and the server play important roles in performing the conferencing function over the LAN/WAN.

Figure 4:
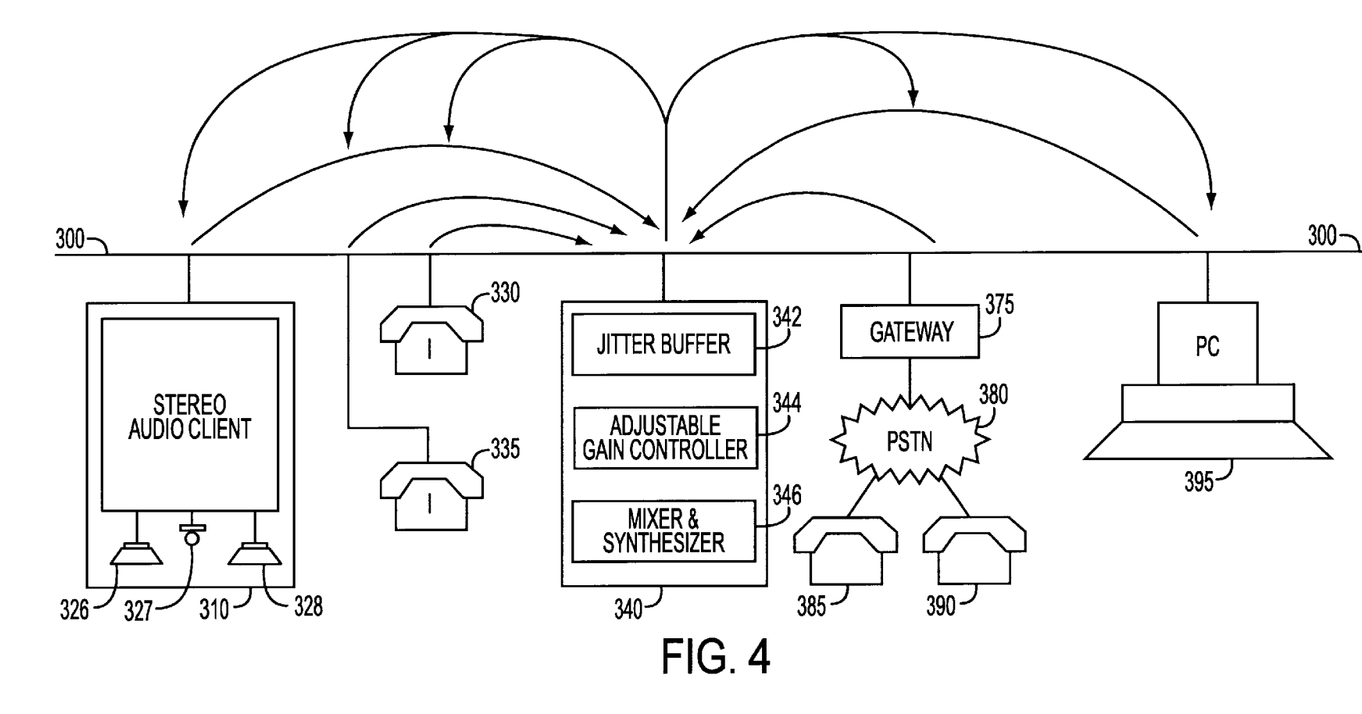
FIG. 4 is a diagram illustrating a third embodiment of the present invention where conferencing is a hybrid client/server function using multicast and where stereo synthesis is a server-based function.

FIG. 4 shows a hybrid client/server system for distributed conferencing according to the present invention. The clients shown, in FIG. 4, to be participating in a conference call include: a stereo audio telephone 310, two Internet Telephones 330 and 335, and a personal computer 395. Also shown as a client is a gateway 375 for allowing connection from the LAN/WAN 300 to, and therefore conferencing of, telephones 385 and 390 from the PSTN 380. Each of the clients involved in a conference call transmit their individual signals to the server 340. These signals are then mixed and stereo synthesized at the server 340 to create a single synthesized multicast signal, which is then transmitted to each of the clients. Accordingly, each client receives the same signal. A particular client receiving the multicast signal then removes its own transmitted component from the signal and outputs the remaining composite signal which contains the conferenced signals of the other users in the conference call but substantially no "echo" of that particular client's output signal. The result is that N independent signals are received by the server but only one signal is transmitted from the server to the individual clients, where N represents the total number of clients involved in the conference. The signals sent to and from the server are shown as arrows in FIG. 4.

In this embodiment of the present invention, the output signals of all of the clients involved in a conference call are received by the server 340. These signals comprise data packets of a defined length, usually 20 milliseconds. The server then, in a jitter buffer 342, synchronizes the data packets from the various received signals to compensate for the small variations in arrival time usually present in signals transmitted over a LAN/WAN. Once the data packets are aligned, the gain of the individual signals is adjusted if necessary as determined by the adjustable gain controller 344. Adjustment is made to equalize signals of clients who, at a given time, are determined to be "active" or talking. Adjustment can also be made to suppress noise from clients who, at a given time, are determined to be silent. The adjusted signals are then stereo synthesized and combined in a stereo mixer 346 to create a single synthesized multicast signal. An algorithm in the server mixes the individually received signals from the clients of the involved in the conference call such that the individual users are virtually positioned about the receiving clients, such as client 310. This synthesis is performed in accordance with the methods of distributing individual user components over multiple channels as described above with reference to FIG. 1. The synthesized multicast signal is then transmitted over the LAN/WAN 300 to all of the clients involved in the conference call.

The multicast signal received at a particular client contains the combined output signals of all of the clients involved in the conference call, including that of the particular client. For example, referring again to FIG. 4, the signal sent to the stereo audio client 310 from the server 340 would contain the combined signals from the Internet Telephones 330 and 335, the personal computer 395, the gateway 375 to the PSTN 380 connected telephones 385 and 390 in addition to the output signal from the stereo audio client 310. The mono-output signal of the stereo audio client 310 is returned as stereo "echo" in the multicast signal with a certain amount of delay and at a different signal levels on the left and right channels. This embodiment of the present invention takes advantage of the fact that, in most cases, the equipment comprising the individual clients is able to perform echo cancellation. Thus, once a multicast signal is received at a particular client, that client will perform stereo echo cancellation, based upon the monophonic transmit reference signal, to substantially eliminate its own component of the multicast signal. The resulting signal, without the client's own component, is output at speakers 326 and 328. Input voice from stereo audio client user is received at the microphone 327.

Figure 6:
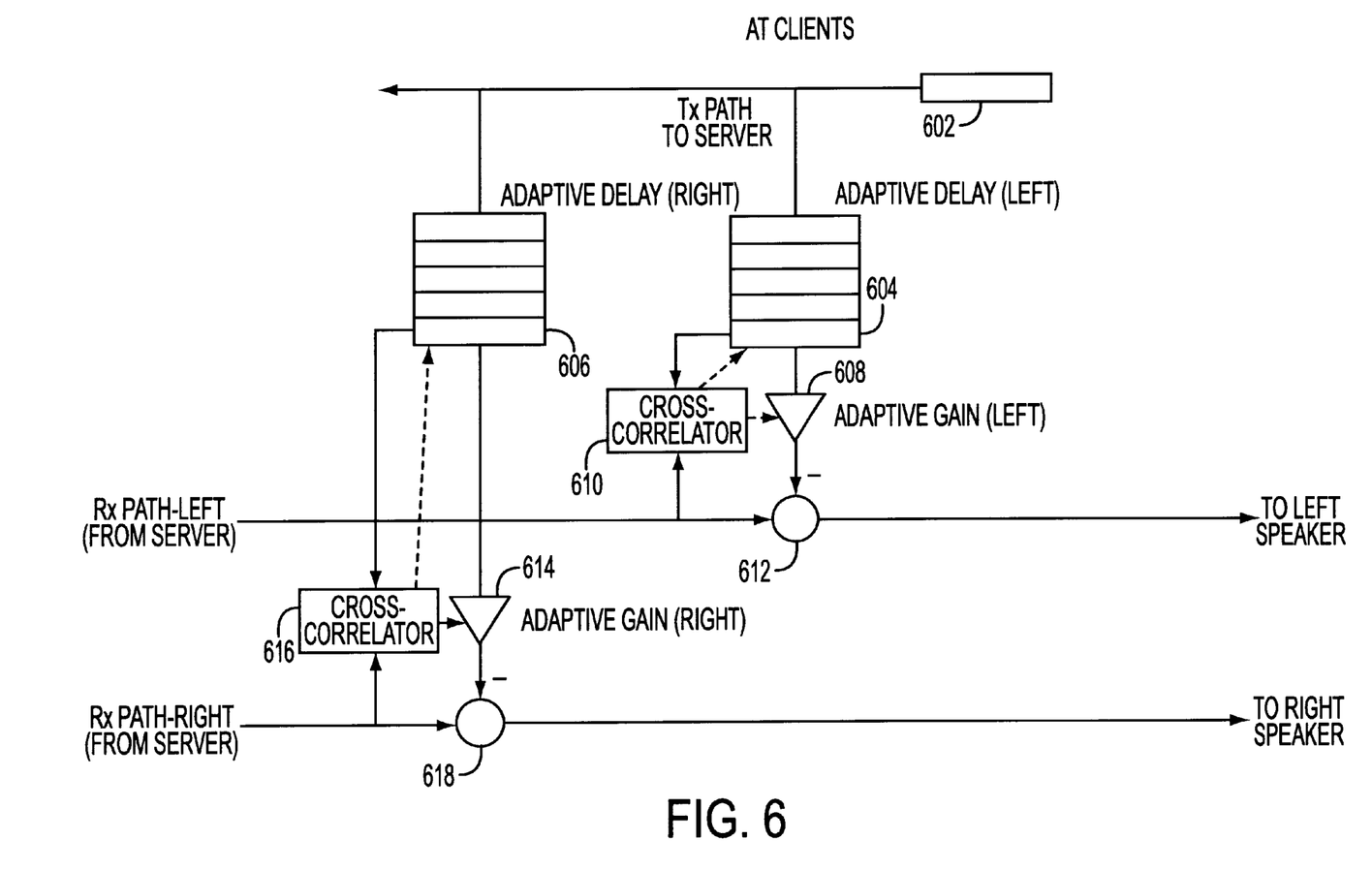
FIG. 6 is a diagram illustrating one method of echo cancellation performed at a given client.

If not addressed, the echo signal received at the client of the client's own transmitted signal would be very distracting to the user. This echo may be controlled using common echo cancellation techniques modified to reflect that the echo signal is distributed over a synthetic stereo signal. FIG. 6 illustrates one method of how such echo cancellation may be implemented at a given client. A buffer 602 is used to packetize the signal to be transmitted to the LAN/WAN. Delay lines 604 and 606 sample each packet of the right and left components of the transmitted signal and hold them for a finite amount of time approximately equal to the amount of delay that is introduced by the network. Cross correlators 610 and 616 are connected between the left and right signal receive paths and the taps of the left and right delay lines 604 and 606. The left and right channels are treated as independent receive signals, though both are correlated to the single channel transmit signal when there is an echo component. The cross correlators are used to determine both the taps of the delay lines 604 and 606 which match the roundtrip delay of the client's echo signal, and the gain/loss introduced through the network and in the server in the left and right echo paths. The echo contained in the left and right channels is then estimated by tapping of the corresponding delay lines at the calculated points and applying the estimated matching gain/loss at the adaptive gain elements (amplifiers) 608 and 614. Simple adaptive gain elements, with the gain determined by the cross correlators, may be used where the server stereo synthesis function is a simple scalar gain/loss and fixed delay. A more complex adaptive transversal filter structure would be necessary for more complex (multi-tap) synthesis functions. The resulting estimated echo, is then subtracted, at subtractors 612 and 618, from the left and right received signals. Other methods for the suppression of the echo signal are known to those skilled in the art and can be used with the present invention.

As described herein, the present invention provides a method of and system for facilitating synthetic stereo audio conferencing of a plurality of users over a local or wide area network (LAN/WAN). The disclosure describes a system architecture using a LAN/WAN to support synthetic audio conferencing thus allowing, at a receiving user location, for the spatially distinct "placement" of the other parties involved in a conference call. This enables the user to differentiate between the various other parties and to discern which one or more of the parties are talking at any given time.

It is intended that the invention, as described herein, includes all variations and modifications as fall within the scope of the claims and equivalents thereof.

What is claimed is:

1. A method of synthetic stereo audio conferencing a plurality of clients over a local or wide area network (LAN/WAN), said method comprising:
   receiving, at a server in said network, a plurality of signals from said plurality of clients over said network;
   synthesizing and mixing said plurality of signals at said server to create at least one client-specific composite signal distributed over multiple channels to effect virtual positioning of said plurality of clients;
   transmitting said at least one client-specific composite signal to one of said plurality of clients in said network; and
   outputting said at least one client-specific composite signal as stereo audio over a plurality of audio output devices at said one of said plurality of clients;
   wherein said at least one client-specific composite signal does not include a signal from said one of said plurality of clients.

2. A method of synthetic stereo audio conferencing a plurality of clients over a local or wide area network (LAN/WAN), as recited in claim 1, wherein said virtual positioning of each of said remainder of said plurality of clients is spatially distributed about a user of said one of said plurality of clients.

3. A method of synthetic stereo audio conferencing a plurality of clients over a local or wide area network (LAN/WAN), as recited in claim 2, wherein said composite signal is output over a left speaker and a right speaker at said one of said plurality of clients.

4. A method of synthetic stereo audio conferencing a plurality of clients over a local or wide area network (LAN/WAN), said method comprising:
   receiving, at a server in said network, a plurality of signals from said plurality of clients over said network;
   synthesizing and mixing said plurality of signals at said server to create a single multicast signal distributed over multiple channels to effect virtual positioning of said plurality of clients;
   transmitting said single multicast signal to each of said plurality of clients in said network;
   receiving said single multicast signal at one of said plurality of clients in said network;
   removing, from said single multicast signal at one of said plurality of clients, a signal component corresponding to a signal transmitted from said one of said plurality of clients to create a composite signal; and
   outputting said composite signal as stereo audio over a plurality of audio output devices at said one of said plurality of clients.

5. A method of synthetic stereo audio conferencing a plurality of clients over a local or wide area network (LAN/WAN), as recited in claim 4, wherein said virtual positioning of said plurality of clients, is spatially distributed about a user of said one of said plurality of clients.

6. A method of synthetic stereo audio conferencing a plurality of clients over a local or wide area network (LAN/WAN), as recited in claim 5, wherein said composite signal is output over a left speaker and a right speaker at said one of said plurality of clients.

7. A method of synthetic stereo audio conferencing a plurality of clients over a local or wide area network (LAN/WAN), as recited in claim 4, wherein said plurality of signals comprise data packets of a defined length and wherein the step of synthesizing and mixing said signals at the server comprises:
   synchronizing data packets received from said plurality of clients using at least one jitter buffer;
   adjusting gain for at least one of said synchronized data packets; and
   synthesizing and mixing said data packets of said plurality of signals to create the single multicast signal.

8. A system for providing synthetic stereo audio conferencing, said system comprising:
   a local or wide area network (LAN/WAN);
   a plurality of clients connected to said network for transmitting signals to and receiving signals from said network; and
   a server connected to said network for receiving a plurality of signals transmitted from said plurality of clients in said network, synthesizing and mixing said plurality of signals to create at least one client-specific composite signal distributed over multiple channels to effect virtual positioning of said plurality of clients, and transmitting said at least one client-specific signal to at least one of said plurality of clients in said network;
   wherein said at least one client-specific composite signal does not include a transmit signal from said one of said plurality of clients.

9. A system for providing synthetic stereo audio conferencing, as recited in claim 8, said at least one of said plurality of clients further comprising a left speaker and a right speaker for outputting said composite signal.

10. A system for providing synthetic stereo audio conferencing, as recited in claim 9, wherein said at least one of said plurality of clients is a stereo hands-free telephone.

11. A system for providing synthetic stereo audio conferencing, as recited in claim 9, wherein said at least one of said plurality of clients is a stereo headset telephone.

12. A system for providing synthetic stereo audio conferencing, said system comprising:
   a local or wide area network (LAN/WAN);
   a plurality of clients connected to said network for transmitting signals to and receiving signals from said network; and a server connected to said network for receiving a plurality of signals transmitted from said plurality of clients in said network, synthesizing and mixing said plurality of signals to create a single multicast signal distributed over multiple channels to effect virtual positioning of said plurality of clients, and transmitting said multicast signal to each of said plurality of clients in said network.

13. A system for providing synthetic stereo audio conferencing, said system comprising:

a local or wide area network (LAN/WAN);

a plurality of clients connected to said network for transmitting signals to and receiving signals from said network; and a server connected to said network for receiving a plurality of signals transmitted from said plurality of clients in said network, synthesizing and mixing said plurality of signals to create a single multicast signal distributed over multiple channels to effect virtual positioning of said plurality of clients, and transmitting said multicast signal to each of said plurality of clients in said network;

wherein said plurality of clients receive said multicast signal transmitted from the server and wherein at least one of said plurality of clients further comprises an echo controller for removing, from said multicast signal, a signal component corresponding to a signal transmitted from said at least one of said plurality of clients, to create a composite signal.

14. A system for providing synthetic stereo audio conferencing, as recited in claim 13, said at least one of said plurality of clients further comprising a left speaker and a right speaker for outputting said composite signal.

15. A system for providing synthetic stereo audio conferencing, as recited in claim 14, wherein said at least one of said plurality of clients is a stereo hands-free telephone.

16. A system for providing synthetic stereo audio conferencing, as recited in claim 14, wherein said at least one of said plurality of clients is a stereo headset telephone.

17. A system for providing synthetic stereo audio conferencing, as recited in claim 13, wherein said plurality of signals comprise data packets of a defined length and wherein said server comprises:

at least one jitter buffer for synchronizing data packets received from said plurality of clients;

an adjustable gain controller for applying adjustable gain to at least one of said synchronized data packets; and a synthesizer and mixer for synthesizing and mixing said data packets of said plurality of signals to create the single multicast signal for transmission to each of said plurality of clients in said network.

18. A server for providing synthetic stereo audio conferencing over a local or wide area network (LAN/WAN) to which said server and a plurality of clients are connected, said server comprising a computer readable medium having program code recorded thereon for controlling said server to perform the following steps:

receiving a plurality of signals transmitted from said plurality of clients in said network;

synthesizing and mixing said plurality of signals to create at least one client-specific composite signal distributed over multiple channels to effect virtual positioning of said plurality of clients; and transmitting said at least one client-specific signal to at least one of said plurality of clients in said network, wherein said at least one client-specific composite signal does not include a transmit signal from said one of said plurality of clients.

19. A system for providing synthetic stereo audio conferencing over a local or wide area network (LAN/WAN), said system comprising:

a plurality of clients connected to said network for transmitting signals to and receiving signals from said network; and a server connected to said network for receiving a plurality of signals transmitted from said plurality of clients in said network, synthesizing and mixing said plurality of signals to create a single multicast signal distributed over multiple channels to effect virtual positioning of said plurality of clients, and transmitting said multicast signal to each of said plurality of clients in said network, wherein said plurality of clients receive said multicast signal transmitted from the server and wherein at least one of said plurality of clients further comprises an echo controller for removing, from said multicast signal, a signal component corresponding to a signal transmitted from said at least one of said plurality of clients, to create a composite signal.

20. A system for providing synthetic stereo audio conferencing, as recited in claim 19, said at least one of said plurality of clients further comprising a left speaker and a right speaker for outputting said composite signal.

21. A system for providing synthetic stereo audio conferencing, as recited in claim 20, wherein said at least one of said plurality of clients is a stereo hands-free telephone.

22. A system for providing synthetic stereo audio conferencing, as recited in claim 20, wherein said at least one of said plurality of clients is a stereo headset telephone.

23. A system for providing synthetic stereo audio conferencing, as recited in claim 19, wherein said plurality of signals comprise data packets of a defined length and wherein said server comprises:

at least one jitter buffer for synchronizing data packets received from said plurality of clients;

an adjustable gain controller for applying adjustable gain to at least one of said synchronized data packets; and a synthesizer and mixer for synthesizing and mixing said data packets of said plurality of signals to create the single multicast signal for transmission to each of said plurality of clients in said network.

* * * * *